United States Patent [19]
Hoffstein et al.

[11] Patent Number: 6,076,163
[45] Date of Patent: Jun. 13, 2000

[54] SECURE USER IDENTIFICATION BASED ON CONSTRAINED POLYNOMIALS

[75] Inventors: Jeffrey Hoffstein, Pawtucket, R.I.; Burton S. Kaliski, Jr., Wellesley, Mass.; Daniel Bennett Lieman, Columbia, Mo.; Matthew John Barton Robshaw, San Francisco; Yiqun Lisa Yin, San Mateo, both of Calif.

[73] Assignee: RSA Security Inc., Bedford, Mass.

[21] Appl. No.: 08/954,712

[22] Filed: Oct. 20, 1997

[51] Int. Cl.[7] .................. H04L 9/32; H04L 9/28; H04L 9/30

[52] U.S. Cl. .......... 713/168; 713/170; 713/176; 380/28; 380/30

[58] Field of Search .................. 380/28, 21, 23, 380/24, 30, 283, 285; 709/228; 713/176, 168, 170

[56] References Cited

U.S. PATENT DOCUMENTS

| | | | |
|---|---|---|---|
| 4,956,863 | 9/1990 | Goss | 380/30 |
| 5,202,921 | 4/1993 | Herzberg et al. | 380/23 |
| 5,231,668 | 7/1993 | Kravitz | 380/28 |
| 5,297,206 | 3/1994 | Orton | 380/30 |
| 5,345,507 | 9/1994 | Herzberg et al. | 380/28 |
| 5,375,170 | 12/1994 | Shamir | 380/30 |
| 5,442,707 | 8/1995 | Miyaji et al. | 380/30 |
| 5,497,423 | 3/1996 | Miyaji | 380/30 |
| 5,799,088 | 8/1998 | Raike | 380/30 |
| 5,889,865 | 3/1999 | Vanstone et al. | 380/25 |

FOREIGN PATENT DOCUMENTS 195 18 544 C1 8/1996 Germany ............ H04L 9/00

OTHER PUBLICATIONS

Brickell et al., "Interactive Identification and Digital Signatures", *AT&T Technical Journal*, pp. 73–86, Nov./Dec. 1991.

Guillou et al., "A Practical Zero-Knowledge Protocol Fitted to Security Microprocessor Minimizing Both Transmission and Memory", *Centre Commun d'Etudes de Télédiffusion et Télécommunications*, pp. 123–128.

Schnorr, "Efficient Identification and Signatures For Smart Cards", *European Patent Appln. 89103290.6*, pp. 239–252, Feb. 24, 1989.

*Primary Examiner*—Tod R. Swann
*Assistant Examiner*—Justin T. Darrow
*Attorney, Agent, or Firm*—Testa, Hurwitz & Thibeault, LLP

[57] ABSTRACT

Methods and apparatus for providing secure user identification or digital signatures based on evaluation of constrained polynomials. In an exemplary user identification technique, a prover sends a verifier a commitment signal representative of a first polynomial satisfying a first set of constraints. The verifier sends the prover a challenge signal representative of a second polynomial satisfying a second set of constraints. The prover generates a response signal as a function of (i) information used to generate the commitment signal, (ii) a challenge signal, and (iii) a private key polynomial of the prover, such that the response signal is representative of a third polynomial satisfying a third set of constraints. The verifier receives the response signal from the prover, and authenticates the identity of the prover by evaluating a function of information contained in at least a subset of (i) the commitment signal, (ii) the challenge signal, (iii) the response signal and (iv) a public key of the prover. In a digital signature technique, the challenge signal may be generated by the prover applying a hash function to (i) a message and (ii) information used to generate the commitment signal, and the prover sends the message to the verifier. The verifier uses a result of applying the hash function to the message and the commitment signal to authenticate a digital signature of the prover. The constraints on the polynomials are selected such that an attacker will find it very difficult to recover the private key polynomial from the partial information sent between the prover and verifier.

36 Claims, 6 Drawing Sheets

PROVER                                              VERIFIER (1) GENERATES POLYNOMIAL $g(x)$ WITH
    BOUNDED COEFFICIENTS (2) COMPUTES $c(x) = \text{Hash}(A_g(x), m)$ FOR
    A MESSAGE $m$, WHERE $A_g(x)$ IS
    SUITABLY FORMATTED AS INPUT
    TO THE FUNCTION $\text{Hash}(\cdot,\cdot)$ AND THE
    OUTPUT OF $\text{Hash}(\cdot,\cdot)$ MAPS ON TO $L_c$ (3) COMPUTES $h(x) = g(x)(f(x)+c(x))$ AND
    SENDS $(A_g(x), h(x))$ TO VERIFIER AS
    SIGNATURE ON MESSAGE $m$

$m, (A_g(x), h(x))$ (4) COMPUTES $\text{Hash}(A_g(x), m)$ TO
    PROVIDE $c(x)$ (5) ACCEPTS SIGNATURE AS VALID IF
    $A_h(x) = A_g(x)(A_f(x) + A_c(x))$ AND $h(x)$
    IS IN $L_h$

FIG. 4

PROVER                                                        VERIFIER (1) GENERATES POLYNOMIAL $g(x)$
    WITH BOUNDED COEFFICIENTS (2) COMPUTES $c(x) = \text{Hash}(A_g(S), m)$ WHERE $A_g(S) = \langle A_g(\alpha_i) \rangle_{\alpha_i \in S}$
    AND $A_g(S)$ IS SUITABLY
    FORMATTED AS INPUT TO $\text{Hash}(\cdot,\cdot)$
    AND THE OUTPUT OF $\text{Hash}(\cdot,\cdot)$
    MAPS ONTO $L_c$ (3) COMPUTES $h(x) = g(x)(f(x) + c(x))$ AND SENDS $(A_g(S), h(x))$ TO
    VERIFIER AS SIGNATURE ON
    MESSAGE $m$ $m, (A_g(S), h(x))$
                        $\longrightarrow$ (4) COMPUTES $\text{Hash}(A_g(S), m)$ TO
                                                    PROVIDE $c(x)$ AND HENCE $c(S)$ (5) ACCEPTS SIGNATURE
                                                    AS VALID IF
                                                    $A_h(S) = A_g(S)(A_f(S) + A_c(S))$
                                                    AND $h(x)$ IS IN $L_h$

FIG. 6

SECURE USER IDENTIFICATION BASED ON CONSTRAINED POLYNOMIALS

FIELD OF THE INVENTION

The present invention relates generally to secure communication over computer networks or in other types of systems and devices, and more particularly to secure user identification and digital signature techniques based on the partial evaluation of constrained polynomials over a finite field.

BACKGROUND OF THE INVENTION

User identification techniques provide data security in a computer network or other communication system by allowing a given user to prove its identity to one or more other system users in the process of communicating with those users. The other system users are thereby assured that they are in fact communicating with the given user. The users may represent individual computers or other types of terminals in the system. A typical user identification process of the "challenge-response" type is initiated when one system user, referred to as the "prover," sends certain information in the form of a commitment to another system user, referred to as the "verifier." Upon receipt of the commitment, the verifier sends a challenge to the prover. The prover utilizes information used to generate the commitment, as well as the challenge and the prover's private key, to generate a response which is sent to the verifier. The verifier uses the commitment, the challenge, the response and a public key to verify that the response was generated by a legitimate prover. The information passed between the prover and verifier is generated in accordance with cryptographic techniques which insure that eavesdroppers or other "attackers" cannot interfere with the identification process.

It is well known that a challenge-response user identification technique can be converted to a digital signature technique by the prover utilizing a one-way hash function to simulate a challenge from a verifier. In such a digital signature technique, a prover generates a commitment, and applies the one-way hash function to it and a message to generate the simulated challenge. The prover then utilizes the simulated challenge, information used to generate the commitment, and a private key to generate a digital signature which is sent along with the message to the verifier. The verifier applies the same one-way hash function during signature verification to recover the simulated challenge, and uses the challenge, the commitment and a public key to validate the signature. As an example of alternative forms of such digital signature schemes, the signature might consist of the challenge and the response from which the commitment and hence the simulated challenge can be recovered. This could then be compared to the challenge included within the signature to test the correctness of the signature.

FIGS. 1A and 1B illustrate two conventional user identification techniques. The notation used to describe the user identification in FIGS. 1A and 1B has been altered relative to the notation of the corresponding cited prior art references for clarity of illustration. FIG. 1A illustrates the operation of an identification technique which involves a prover exponentiating a fixed base a to some randomly-selected power g modulo p and sending it to a verifier, in the manner described in U.S. Pat. No. 4,995,082 and C. P. Schnorr, "Efficient Identification and Signatures for Smart Cards," in G. Brassard, editor, Advances in Cryptology—Crypto '89, Lecture Notes in Computer Science 435, Springer-Verlag, 1990, pp. 239–252. The security of the Schnorr technique relies on the one-way property of the exponentiation function, which makes it difficult for an attacker to compute discrete logarithms with base $\alpha$ to thereby determine the otherwise unknown power g.

FIG. 1A indicates that in accordance with the Schnorr technique, two prime numbers p and q are chosen at random such that q|p−1, and a number $\alpha$ with order q is selected. The numbers p, q and $\alpha$ are made available to all users. The private key of the prover is a mod q and the public key v of the prover is $\alpha^{-a}$ mod p. The prover initiates the identification process by selecting a random number g from the set $Z_q$ which consists of the integers {1, . . . ,q−1}. The prover computes the quantity $\alpha^g$ mod p and sends it as a commitment to the verifier. The verifier selects a random number c from the set of integers {1, . . . ,$2^t$} where t is a security number which depends on the application and in the above-cited article is selected as 72. The verifier sends c as a challenge to the prover. The prover computes a number h corresponding to the quantity g+ac(mod q) as a response, and sends it to the verifier. The verifier accepts the prover as securely identified if cog is found to be congruent modulo p to the quantity $\alpha^h v^c$.

FIG. 1B illustrates the operation of an identification technique which involves a prover raising a randomly-selected argument g to the power b modulo n and sending it to a verifier, in the manner described in L. C. Guillou and J. J. Quisquater, "A Practical Zero-Knowledge Protocol Fitted to Security Microprocessor Minizing Both Transmission and Memory," in C. G. Gunther, editor, Advances in Cryptology—Eurocrypt '88, Lecture Notes in Computer Science 330, Springer-Verlag, 1988, pp. 123–128. The security of the Guillou-Quisquater technique relies on the difficulty of factoring a product of two large prime numbers. FIG. 1B indicates that in accordance with the Guillou-Quisquater technique, two prime numbers p and q are selected at random, the number n is generated as the product of p and q, and the number b is selected at random. The numbers n and b are made available to all users. The private key of the prover is a mod n and the public key v of the prover is $a^{-b}$ mod n. The prover initiates the identification process by randomly selecting g from the set $Z_n$, which consists of the integers {1, . . . ,n−1}. The prover computes the quantity $g^b$ mod n and sends it as a commitment to the verifier. The verifier selects a random number c from the set of integers {1, . . . ,b−1} and sends c as a challenge to the prover. The prover computes a number h corresponding to the quantity ga$^c$(mod n) as a response, and sends it to the verifier. The verifier accepts the prover as securely identified if $g^b$ is found to be congruent modulo n to $h^b v^c$.

Although the above-described Schnorr and Guillou-Quisquater techniques can provide acceptable performance in many applications, there is a need for an improved technique which can provide greater computational efficiency than these and other prior art techniques, and which relies for security on features other than the discrete logarithm problem and integer factorization.

SUMMARY OF THE INVENTION

The present invention provides methods and apparatus for performing user identification, digital signatures and other secure communication functions based on the difficulty of recovering a constrained polynomial from partial information. The constrained polynomials are subject to certain predetermined conditions, such as bounded coefficients, which ensure that improper recovery of a polynomial from partial information sent over an insecure channel is a particularly difficult task.

A first illustrative embodiment of the invention provides a user identification technique and a corresponding digital signature technique. In the user identification technique, a first user, referred to as a prover, selects a bounded commitment polynomial $g(x)$ meeting certain predetermined conditions, evaluates $A_g(x)$ where $A_g(x)=g(x)*g^r(x)$, where * denotes a reduced polynomial multiplication and $g^r(x)$ denotes a polynomial in which the coefficients of the non-constant terms are taken in the reverse order to those in $g(x)$, and sends it to a second user referred to as a verifier. The conditions on $g(x)$ may require that $g(x)$ be selected from all polynomials of degree $d$ less than or equal to $q-2$ with coefficients chosen randomly from a set of values such as $\{0, 1, -1, 2, -2, 3, -3\}$ or $\{0, 1, q-1, 2, q-2, 3, q-3\}$. The verifier selects a bounded challenge polynomial $c(x)$ meeting certain predetermined conditions and sends it to the prover. The prover uses $g(x)$, $c(x)$ and its private key polynomial $f(x)$, which also meets certain predetermined conditions, to generate a response polynomial $h(x)$ which is sent to the verifier. The response polynomial $h(x)$ may be generated by computing products of the form $g(x)*(f(x)+c(x))$. Alternatively, $h(x)$ could be generated by choosing a set of polynomials $g_i(x)$, receiving a set of challenge polynomials $c_i(x)$, and generating the response polynomial $h(x)$ as a function of one or more secret keys $f_i(x)$ and selected polynomials $g_i(x)$ and $c_i(x)$. The verifier evaluates $A_h(x)$, checks the constraints on $h(x)$, and compares the result to a function of $A_g(x)$, $A_c(x)$ and a public key $A_f(x)$ of the first user, where $A_c(x)$ and $A_f(x)$ are computed from polynomials $c(x)$ and $f(x)$, respectively. The verifier uses the result of the comparison for secure identification of the prover.

The above-described user identification technique can be converted to a digital signature technique by the prover applying a one-way hash function to $A_g(x)$ and a message $m$ to generate a simulated challenge polynomial $c(x)$ which may be used in conjunction with $g(x)$ and $f(x)$ to generate the response polynomial $h(x)$. The verifier receives $m$, $A_g(x)$ and $h(x)$, uses the one-way hash function to derive $c(x)$, and compares $A_h(x)$ to $A_g(x)*(A_f(x)+A_c(x))$ in order to authenticate the digital signature of the prover. Alternatively, the signature might consist of $c(x)$ and $h(x)$. From this $A_g(x)$ can be recovered as $A_h(x)*(A_f(x)+A_c(x))-1$ and the hash of this quantity and the message $m$ can be compared to the polynomial $c(x)$. A desired security level in both the user identification and digital signature techniques may be provided by selecting appropriate constraints for the polynomials $g(x)$, $c(x)$ and $h(x)$.

A second illustrative embodiment of the invention also provides a user identification technique and a corresponding digital signature technique. In the user identification technique, the prover selects a bounded polynomial $g(x)$ meeting certain predetermined conditions, evaluates $A_g(x)$ at a set of values $\alpha_i$ in a set S, and sends the result $A_g(S)$ to the verifier. The verifier selects a bounded polynomial $c(x)$ meeting certain predetermined conditions and sends it to the prover. The prover uses $g(x)$, $c(x)$ and its private key polynomial $f(x)$, which also meets certain predetermined conditions, to generate a response polynomial $h(x)$ which is sent to the verifier. As in the first embodiment, the polynomial $h(x)$ may be generated by computing products of the form $g(x)*(f(x)+c(x))$. The verifier evaluates $A_h(x)$ at the values $\alpha_i$ in set S and compares the result to a function of $A_g(S)$, $A_c(S)$ and a public key $A_f(S)$ of the first user, where $A_c(S)$ and $A_f(S)$ are computed from polynomials $c(x)$ and $f(x)$, respectively. The verifier uses the result of the comparison for secure identification of the prover.

The user identification technique of the second embodiment can be converted to a digital signature technique by the prover applying a one-way hash function to $A_g(S)$ and a message or to generate a simulated challenge polynomial $c(x)$ which may be used in conjunction with $g(x)$ and $f(x)$ to generate $h(x)$. The verifier receives $m$, $A_g(S)$ and $h(x)$, uses the one-way hash function to derive $c(x)$, and compares $A_h(S)$ to $A_g(S)(A_f(S)+A_c(S))$ to authenticate the digital signature. As in the digital signature technique of the first embodiment, an alternative signature might consist of $c(x)$ and $h(x)$, such that $A_g(S)$ can be recovered, and the hash of $A_g(S)$ and the message $m$ can be compared to the polynomial $c(x)$. Again, a desired security level in both the user identification and digital signature techniques may be provided by selecting appropriate constraints for the polynomials $g(x)$, $c(x)$ and $h(x)$.

The use of constrained polynomials in accordance with the invention provides user identification and digital signature techniques which are computationally more efficient than prior art techniques. The security of the techniques of the present invention are based on the fact that recovering a polynomial from partial information can, in certain circumstances, be a particularly difficult task. These and other features of the present invention will become more apparent from the accompanying drawings and the following detailed description.

BRIEF DESCRIPTION OF THE DRAWINGS

FIGS. 3 and 4 illustrate a user identification technique and corresponding digital signature technique, respectively, in accordance with a first exemplary embodiment of the invention.

FIGS. 5 and 6 illustrate a user identification technique and corresponding digital signature technique, respectively, in accordance with a second exemplary embodiment of the invention

DETAILED DESCRIPTION OF THE PREFERRED EMBODIMENTS

The present invention will be illustrated below in conjunction with exemplary user identification and digital signature techniques carried out by a prover and a verifier in a communication network, smart card reader or other type of system. It should be understood, however, that the present invention may be applied to a variety of other user and data authentication applications. The term "user" may refer to either a user terminal, an individual using that terminal, or both, and the terminal may be any type of computer, smart card or other digital data processor or device suitable for directing data processing operations. The term "prover" as used herein is intended to include any user which needs to prove its identity in an identification, digital signature or other secure communication process. The term "verifier" is intended to include any user which makes a determination as to whether a particular communication is legitimate. The term "user identification" is intended to include identification techniques of the challenge-response type as well as other types of identification, authentication and verification techniques. Any references herein to sending a polynomial to or from a prover or a verifier should be understood to include sending a signal which is representative of the polynomial, where the signal may be the polynomial itself or any suitable representation thereof. A signal "representative of a polynomial" as the term is used herein may be a signal which corresponds to the polynomial itself or may be a signal which includes information derived from the polynomial.

Figure 1A:
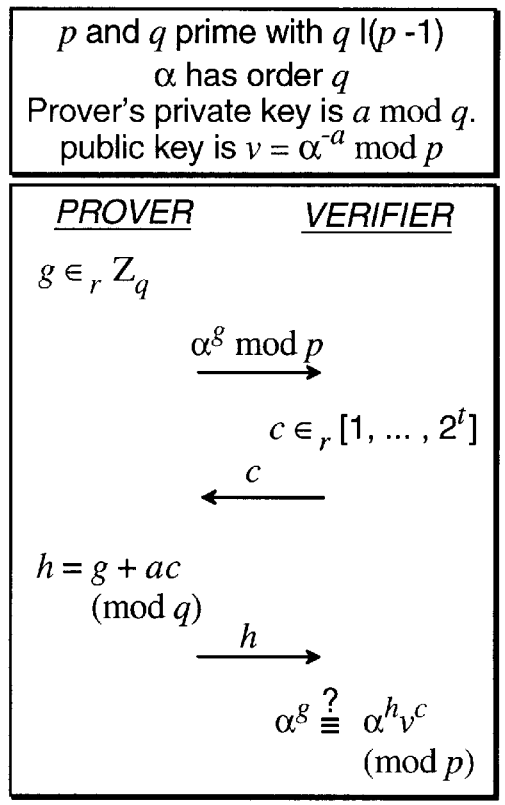
FIGS. 1A and 1B illustrate exemplary user identification techniques in accordance with the prior art.
Figure 1B:
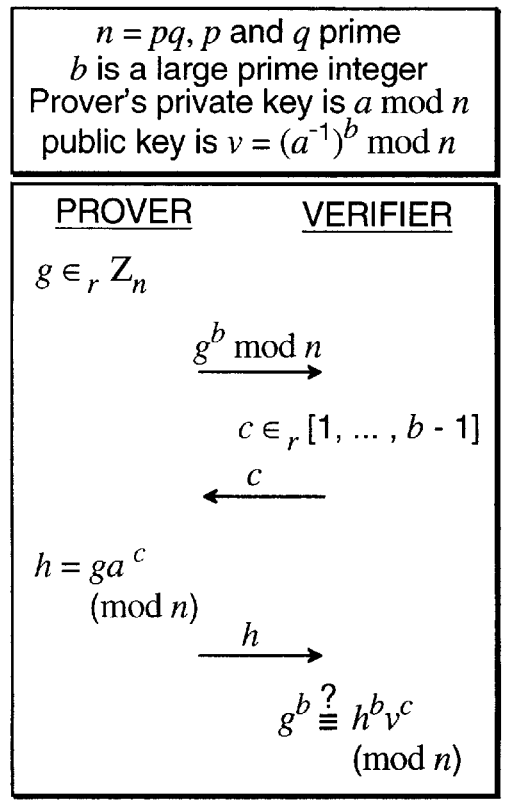
Figure 2A:
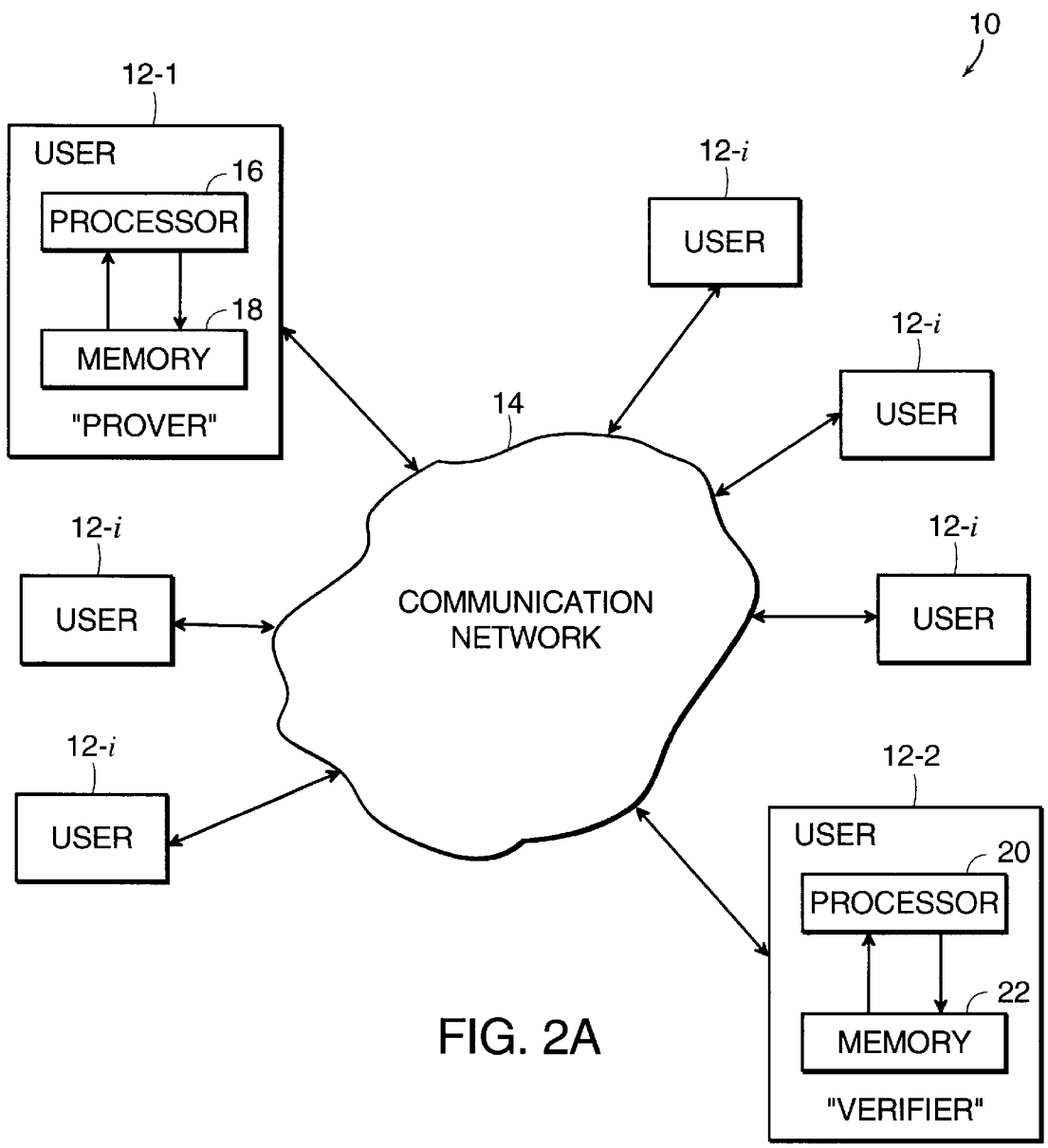
FIGS. 2A and 2B are block diagrams of exemplary systems in which the user identification and digital signature techniques of the invention may be implemented.

FIG. 2A shows a communication system 10 in which user identification or digital signature techniques in accordance with the present invention may be implemented. The system 10 includes a number of different users 12-$i$, i=1, 2, . . . N, which communicate with each other via a communication network 14. The users 12-$i$ may represent personal desktop or portable computers, microcomputers, mainframe computers, workstations, telephones, facsimile machines, personal communication devices, digital notepads, television set top boxes or any other type of communication terminals in various combinations. The communication network 14 may represent a global computer network such as the Internet, a wide area network (WAN), a local area network (LAN), a satellite network, a telephone or cable network, or various combinations of these and other types of networks. The network may operate using conventional data transfer techniques including but not limited to asynchronous transfer mode (ATM), synchronous optical network/synchronous digital hierarchy (SONET/SDH) and/or transmission control protocol/Internet protocol (TCP/IP).

A particular one of the users 12-$i$ in the system 10 is designated in this illustration as a prover 12-1. The prover 12-1 includes a processor 16 bidirectionally coupled to a memory 18. Another of the users 12-$i$ in system 10 is designated a verifier 12-2. The verifier 12-2 includes a processor 20 bidirectionally coupled to a memory 22. The processors 16, 20 are used to generate the information communicated between the prover 12-1 and verifier 12-2 during exemplary identification and digital signature techniques to be described below, while the memories 18, 22 store intermediate results and other information used in the identification and digital signature techniques. It should be noted that in general any of the users 12-$i$ of system 10 may be acting as either a prover or a verifier or both at any given time. For example, the user 12-2 may be verifying user 12-1 while also acting as a prover to another user 12-$i$ and a verifier of yet another user 12-$i$.

Figure 2B:
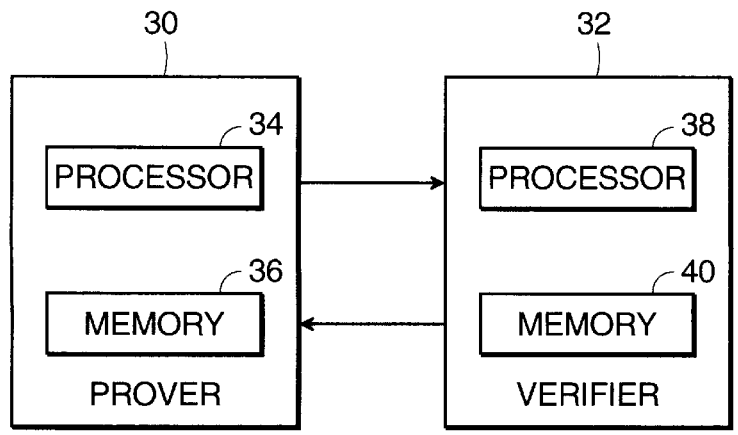

FIG. 2B shows another exemplary embodiment of the invention. In this embodiment, a prover 30 and verifier 32 are configured to communicate as shown. The prover 30 includes a processor 34 and a memory 36, and the verifier 32 includes a processor 38 and a memory 40. The prover 30 may be implemented as a smart card, while the verifier 32 is a processing terminal with a card reader designed to receive the smart card. The interconnection between the prover 30 and the verifier 32 in FIG. 2B may therefore represent a temporary interconnection which is present when a smart card is inserted into a card reader. The user identification and digital signature techniques of the invention may also be implemented in a wide variety of other system configurations.

The user identification and digital signature techniques in accordance with the invention are based on partial evaluation of constrained polynomials over a finite field. A finite field $\mathbb{F}_q=Z/qZ$ is defined for a small prime number q. A constrained polynomial $f(x)=a_d x^d + a_{d-1} x^{d-1} + \ldots + a_1 x + a_0$ of degree d less than or equal to q−2 has bounded coefficients modulo q and so the polynomial can be viewed as being taken from the finite field $\mathbb{F}q[x]/(x^{q-1}-1)$ which is denoted $\mathbb{F}_q$. S denotes a subset of t non-zero integers modulo q of field $\mathbb{F}_q$, and $f(S)=<f(\alpha)>_{\alpha \in S}$ denotes an evaluation of the polynomial f(x) at points $\alpha$ in S that are taken in a fixed order. $A_f(x)$ denotes the polynomial obtained by computing $f(x)*f^r(x)$ using a reduced polynomial multiplication technique, where $f^r(x)$ is obtained by replacing each $a_i x^i$ for $i \geq 1$ with $a_i x^{q-1-i}$ while keeping $a_0$ fixed. $A_f(x)$ is sometimes referred to as the autocorrelation function. With suitable restrictions on f(x) and suitable choices for $\alpha$ in S, it appears to be infeasible to recover f(x) when given only $A_f(S)$ or $A_f(x)$. As will be described in greater detail below, these properties provide a one-way function that is particularly well-suited for use in implementing efficient user identification and digital signatures.

The private key f(x) is transformed into a public key $A_f(x)$ or $A_f(S)$ through the use of a mapping. As noted above, this mapping has the property that it is easy to compute $A_f(x)$ or $A_f(S)$ from f(x) yet it is hard to find a constrained polynomial f(x) when given a corresponding value $A_f(x)$ or $A_f(S)$. The mapping may also have what is termed a homomorphism property. The homomorphism property is satisfied, given f(x) mapped to F and g(x) mapped to G, if f(x)+g(x) is mapped to F+G and f(x)×g(x) is mapped to F×G. The notation "+" and "×" should not be viewed as limited to the typical analogues of addition and multiplication, but instead represent any operations that provide the homomorphism property. Examples of such mappings include the mapping provided between polynomials defined over a finite field and their evaluation at certain elements, the computation of an auto-correlation function, or systems that use some combination of both of these techniques. As a further example of the use of polynomial evaluation, F may be defined as the result f(S) of evaluating the polynomial f(x) at values $\alpha_i$ in a public set S whereby F serves as a public key for the given user. The set of values $\alpha_i$ may correspond to predetermined integers between 1 and q−1. The operation "+" may be component-wise addition of polynomials, while the operation "×" may be a reduced product of two polynomials where the reduction is performed modulo some other polynomial, which may be of the form $x^{q-1}-1$, and also modulo some integer modulus, such as a prime number q. An explicit description of such a reduced product is given below. It should be noted that different choices of polynomial constraints and homomorphisms may be used in alternative embodiments.

The identification and digital signature techniques of the invention make use of a reduced product h(x) of two polynomials f(x) and g(x), generated using the above-noted reduced polynomial multiplication technique. This reduced polynomial multiplication will now be described in greater detail. Given a polynomial $f(x)=a_{q-2}x^{q-2}+a_{q-3}x^{q-3}+ \ldots +a_1 x + a_0$ in $\mathbb{F}_q$ and a polynomial $g(x)=b_{q-2}x^{q-2}+b_{q-3}x^{q-3}+ \ldots +b_1 x + b_0$ in $\mathbb{F}_q$, an exemplary reduced product $h(x)=f(x)*g(x)$ may be given by:

$$h(x) = \sum_{i=0}^{q-2} c_i x^i$$

where $c_i$ is given by:

$$c_i = \sum_{j=0}^{i} a_j b_{i-j} + \sum_{j=i+1}^{q-2} a_j b_{q-1+i-j} \bmod q.$$

It can be shown that the complete product f(x)g(x) is congruent to the reduced product $f(x)*g(x) \bmod (x^{q-1}-1)$ and mod q. All references to multiplication of polynomials in the remaining description should be understood to refer to the above-described exemplary reduced product multiplication in $\mathbb{F}_q$. It should also be noted that the above-described reduced product multiplication is not a requirement of the invention, and alternative embodiments may use other types of reduced product multiplication.

In a first embodiment of the invention, the system parameters include the selection of the prime number q and restraints on the selection of polynomial coefficients. As noted above, the reduced polynomial f(x) taken from the field $\mathbb{F}_q = \mathbb{F}_q[x]/(x^{q-1}-1)$ has bounded coefficients. $L_f$ denotes a set of restricted polynomials in $\mathbb{F}_q$ with bounded coefficients. Given the prime number q and the polynomial f(x) it is relatively easy to generate $A_f(x)$. However, appropriately selected restrictions on polynomials in $L_f$ can make it extremely difficult to determine a polynomial f(x) in $L_f$ such that $A_f(x)=A_f(x)$. The inversion difficulty is generally dependent on the type of restrictions placed on the polynomials in $L_f$. It will be shown in greater detail below that establishing appropriate restrictions on the polynomials in $L_f$ can provide adequate levels of security in many important practical applications.

Figure 3:
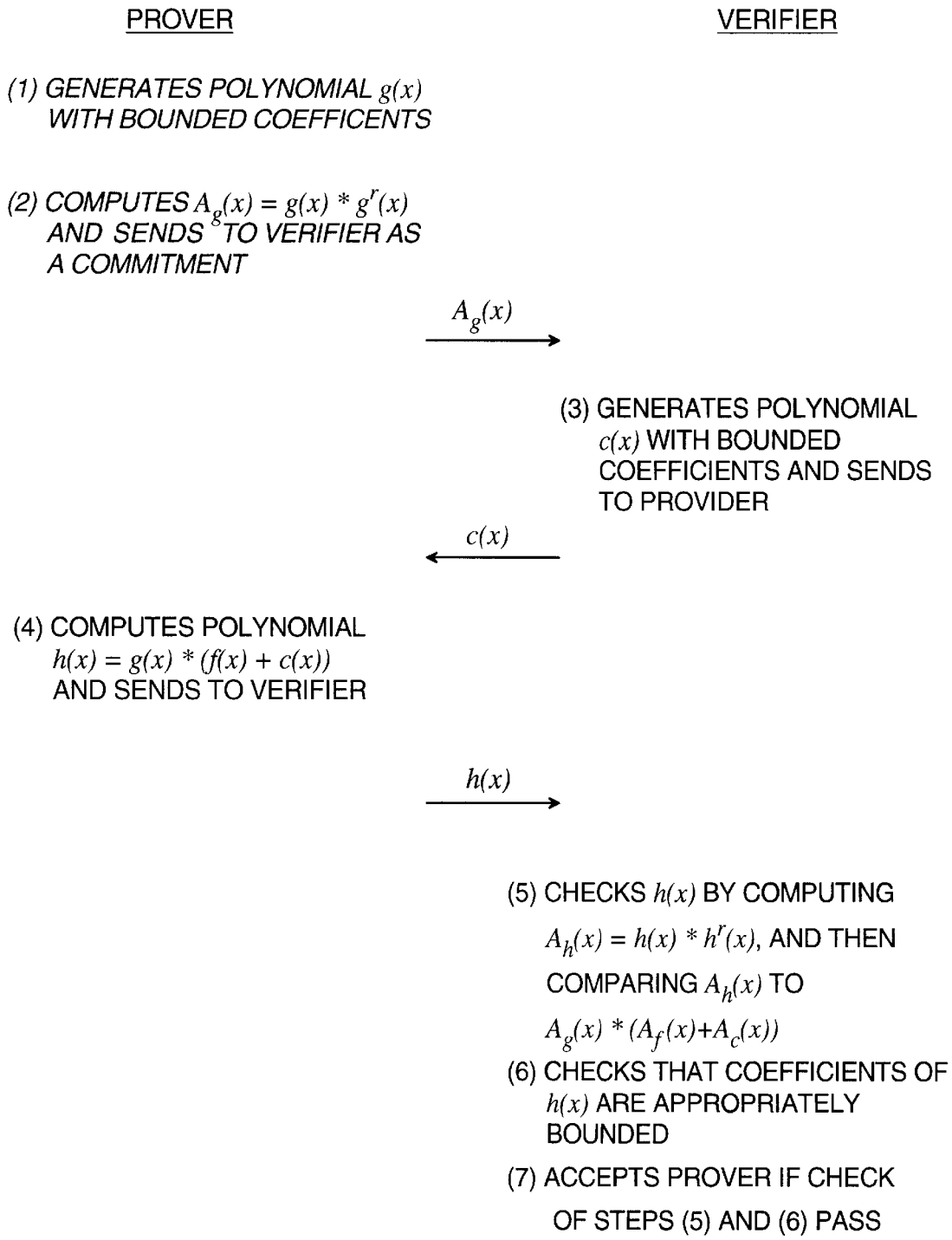

FIG. 3 illustrates an exemplary user identification technique in accordance with the first embodiment of the invention. As previously mentioned, the system parameters in this embodiment are the above-noted prime number q and appropriate bounds on certain polynomial coefficients. These system parameters may be established by a central authority and made public to all users. A prover randomly chooses a secret polynomial $f(x) \in L_f$ as its private key. The public key of the prover is then generated as $A_f(x)$, where $A_f(x)=f(x)*f^r(x)$. The identification process is initiated in step (1) by the prover generating a polynomial g(x) with bounded coefficients. The polynomial g(x) may be selected at random from a set $L_g$ which is restricted in a manner to be described below. The prover in step (2) uses the polynomial g(x) to compute a commitment $A_g(x)=g(x)*g^r(x)$, and sends the commitment $A_g(x)$ to the verifier.

The verifier in step (3) generates a challenge polynomial c(x) with bounded coefficients and sends it to the prover. The polynomial c(x) may be generated by random selection from a set of polynomials $L_c$ which is restricted in a manner to be described below. The prover in step (4) uses the polynomials c(x), g(x) and the secret polynomial f(x) to generate a response polynomial h(x) given by:

$$h(x)=g(x)*(f(x)+c(x))$$

The prover sends h(x) to the verifier. The verifier in step (5) uses its knowledge of the commitment $A_g(x)$, the challenge c(x) and the public key $A_f(x)$ to check that the response polynomial h(x) was generated using the private key f(x) of the prover. The check in this embodiment involves computing $A_h(x)=h(x)*h^r(x)$ and comparing the result to the polynomial $A_g(x)*(A_f(x)+A_c(x))$, where $A_c(x)=c(x)*c^r(x)$. In addition, the verifier in step (6) also checks whether or not the coefficients of h(x) are appropriately bounded, given that a legitimate h(x) will have bounded coefficients and will belong to a restricted set $L_h$ of polynomials.

In order for the verifier to check efficiently whether the response polynomial h(x) is of the proper form, the verifier may use a related set of polynomials $L_h'$ which provides an approximation to the set $L_h$ of all legitimate polynomials h(x). The related set of polynomials $L_h'$ is typically designed so that any polynomial that is accepted as being in $L_h'$ will, with a suitably high probability, also lie within the set $L_h$. Of course, the set $L_h'$ should not be defined so broadly that conditions on membership in $L'_h$ are too easily satisfied. It will be shown below that for certain sets $L_f$, $L_g$ and $L_c$, it is possible to define $L_h'$ such that testing whether h(x) lies in $L_h'$ is straightforward and provides an acceptable indication as to whether or not h(x) lies within $L_h$. Although the use of the related set of polynomials $L_h'$ might involve a theoretical chance that a legitimate prover will not be correctly identified, the probability of such an occurrence can be made extremely small and is therefore not of practical concern.

A legitimate polynomial h(x) generated in accordance with the above-described technique will fall, with some probability, within some set $L_h'$ of polynomials in $\mathbb{F}_q$ with bounded coefficients in the range $[0, \ldots, r]$ or $[s, \ldots, q-1]$, where r and s are selected as system parameters. The restrictions on the set $L_h'$ depend on the choice of the above-noted sets $L_f$, $L_g$ and $L_c$ and the level of confidence required in a given application that a legitimate prover is accepted as being so. The verifier in step (7) accepts the prover as legitimate if the response polynomial h(x) sent by the prover passes the checks of steps (5) and (6). The verifier may perform a number of other checks as part of the identification process.

An exemplary set of system parameters suitable for use with the above-described identification technique will now be described. It should be emphasized that these and other exemplary parameters described herein are illustrative only and that numerous alternative sets of parameters could also be used. In this exemplary set of parameters, the prime number q is selected as 163, and integers are selected from the field $\mathbb{F}_{163}$. The set $L_f$ is the set of all polynomials f(x) of degree $d \leq 161$ constructed by choosing a polynomial $f_0(x)$ of degree 81 where $f_0(0)=0$ and $f_0(x)-x^{81}$ has 10 coefficients of value 1 and 10 coefficients of value q−1, 14 coefficients of each value 2 and q−2, 15 coefficients of each value 3 and q−3, and the remaining coefficients set to zero. The secret polynomial f(x) is generated as $f(x)=f_0(x)+f_0^r(x)$. The set $L_g$ is the set of all polynomials g(x) of degree $d \leq 161$ having 42 coefficients of value 1 and all other coefficients set to zero. The set $L_c$ is the set of polynomials of degree $d \leq 161$ constructed by selecting a polynomial $c_0(x)$ of degree $\leq 81$ where $c_0(0)=0$ and $c_0(x)$ has 3 coefficients of value 1, 3 coefficients of value 162 and all other coefficients set to zero, and generating c(x) as $c(x)=c_0(x)-c_0^r(x)$. Finally, the set $L_h$ is the set of polynomials of degree $d \leq 161$ with at least 90% of the coefficients (i.e., 145 coefficients for the parameters in this example) falling in the ranges $[0, \ldots, 40]$ and $[123, \ldots, 162]$. The user identification technique described in conjunction with FIG. 3 above is then implemented using polynomials selected from the sets $L_f$, $L_g$, $L_c$ and $L_h$.

An alternative implementation of the identification technique of FIG. 3 may involve the prover selecting a set of N polynomials $g_i(x)$, $i=1, 2, \ldots N$. The prover then transmits a corresponding set of N commitments $A_{g_i}(x)$ to the verifier, receives a corresponding set of N challenge polynomials $c_i(x)$ from the verifier, and generates h(x) as a function of the secret key f(x) and one or more selected polynomials $g_i(x)$ and $c_i(x)$. Other alternative implementations may utilize more general techniques in which, for example, a multiplicity of secret polynomials fi(x) are used in the identification process.

FIG. 4 illustrates the operation of an exemplary digital signature technique implemented using the above-described problem of constrained polynomial recovery. In a digital signature technique, the prover generates a simulated challenge polynomial c(x) rather than receiving c(x) from the verifier. The prover may generate the challenge polynomial by applying a one-way hash function to a message m and a commitment $A_g(x)$. The one-way hash function is also available to the verifier, and will be used to validate the digital signature. As shown in step (1) of FIG. 4, the prover generates a polynomial g(x) having bounded coefficients as previously described, and uses g(x) to generate the commitment $A_g(x)$. The prover in step (2) computes a challenge polynomial c(x) by applying a hash function Hash(•, •) to the message m and commitment $A_g(x)$ so that c(x) is generated as Hash($A_g(x)$,m). The commitment $A_g(x)$ is suitably formatted as an input to the function Hash(•, •), and the output c(x) of Hash(•, •) maps onto the set $L_c$. In step (3), the prover computes a response polynomial h(x) as in the above-described user identification embodiment. For example, h(x) may be computed as g(x)f(x)+c(x)). The prover then sends the message m to the verifier, along with the pair ($A_g(x)$, h(x)) as a digital signature on the message m. In step (4), the verifier uses the one-way hash function to compute c(x)=Hash($A_g(x)$,m) and evaluates the result to determine c(x). The verifier accepts the signature as valid if $A_h(x)=A_g(x)$ ($A_f(x)+A_c(x)$) and h(x) is within the set $L_h$. As in the user identification embodiment, the verifier may determine if h(x) is in a related set of polynomials $L'_h$ rather than in $L_h$ in order to simplify the signature validation process.

The digital signature technique may also be implemented using the above-noted alternatives in which h(x) is generated as g(x)(c(x)g'(x)+f(x)) or as another function of some number of selected polynomials $g_i(x)$ and $c_i(x)$ and potentially a set of multiple secret keys $f_i(x)$. In addition, the above signature technique could be implemented using a signature of the form (A(x), c(x)). On receiving this signature, a verifier can then recover $A_g(x)$ as $A_h(x)(A_f(x)+A_c(x))-1$ and subsequently check that c(x)=Hash($A_g(x)$,m). Another alternative implementation of the digital signature technique may involve computing $g'(x)=A_g(x)+m$ and c(x)=Hash(g'(x)). The response polynomial h(x) is again computed as g(x)(f(x)+c(x)), and the signature on message m is (h(x), g'(x)). The verifier computes c(x) as Hash(g'(x)), recovers $A_g(x)$ as $A_h(x)(A_f(x)+A_c(x))-1$, and then recovers m as $g'(x)-A_g(x)$. In this case, the prover does not send the message m. If m has some expected redundancy, the check is passed and the signature is valid. This latter type of digital signature implementation may be said to have a "message recovery" capability, and can be particularly useful in reducing the amount of communication required when the message m to be signed is short. Further variants of the signature technique may involve recovering other quantities as a function of those provided by the prover as a part of the digital signature. These and other various alternative embodiments of the digital signature techniques of the invention may offer different implementation advantages in different application environments.

It should be noted that certain implementations of the invention involve computing an inverse, as in the computation $A_h(X)(A_f(x)+A_c(x))-1$ in the alternative digital signature techniques described above. There is a possibility that for a given legitimate c(x) and f(x), the quantity $A_f(x)+A_c(x)$ may not have an inverse, such that $A_g(x)$ will therefore not be recoverable from $A_h(x)(A_f(x)+A_c(x))-1$ for the given c(x) and f(x). However, the implementations in which this possibility arises can be modified in a straightforward manner to allow recovery of $A_g(x)$ without any difficulty. In an implementation in which c(x) is generated as Hash($A_g(x)$,m), if the resulting c(x) is such that $A_f(x)+A_c(x)$ does not have an inverse, then a previously agreed upon method can be invoked to transform c(x) into some c'(x) which will be used in place of c(x). There are many different ways in which such a transformation can be accomplished. One possibility is to include a counter k, compute c(x) as Hash($A_g(x)$, m, k), and if the resulting c(x) does not satisfy invertibility of $A_f(x)+A_c(x)$, increment k and recompute the hash function with the new value of k. This process is repeated until a c'(x) which satisfies invertibility of $A_f(x)+A_c(x)$ is obtained. The value of k could become part of the signature, or it could be understood by the verifier that the minimum possible integral value of k should be used. Alternatively, one might continue to generate c(x) as Hash($A_g(x)$,m), but if the resulting $A_f(x)+A_c(x)$ is not invertible, then c(x) is replaced by c'(x) where c'(x) is obtained by adding a previously agreed upon polynomial to c(x) until an invertible quantity $A_f(x)+A_c(x)$ is recovered.

A second embodiment of the invention, which may be implemented as a user identification technique or a digital signature technique, will now be described in conjunction with FIGS. 5 and 6. In this embodiment, the hard problem of reconstructing a constrained polynomial includes the process of evaluating a polynomial at a specific set of points. At the expense of setting up more system parameters, this second embodiment may offer implementation advantages over the first embodiment since it can potentially lead to reduced communication costs. As in the first embodiment described above, the reduced polynomial f(x) taken from the field $\mathbb{F}_q=\mathbb{F}_q[x]/(x^{q-1}-1)$ has bounded coefficients, and $L_f$ denotes a set of restricted polynomials in $\mathbb{F}_q$ with bounded coefficients. S denotes a subset of t non-zero integers modulo q of field $\mathbb{F}_q$, and $f(S)=<f(\alpha)>_{\alpha \in S}$ denotes an evaluation of the polynomial f(x) at points $\alpha \in S$ taken in a fixed order. Given the prime number q and the polynomial f(x), it is relatively easy to generate $A_f(S)=<A_f(\alpha)>_{\alpha \in S}$. However, appropriately selected restrictions on polynomials in $L_f$ can make it extremely difficult to determine a polynomial $f(x) \in L_f$ such that $(A_f(\alpha))=(A_f(\alpha)>$ for all $\alpha \in S$. As in the previous embodiment, the inversion difficulty is generally dependent on the type of restrictions placed on the polynomials in $L_f$, and establishing appropriate restrictions can provide adequate levels of security.

Figure 5:
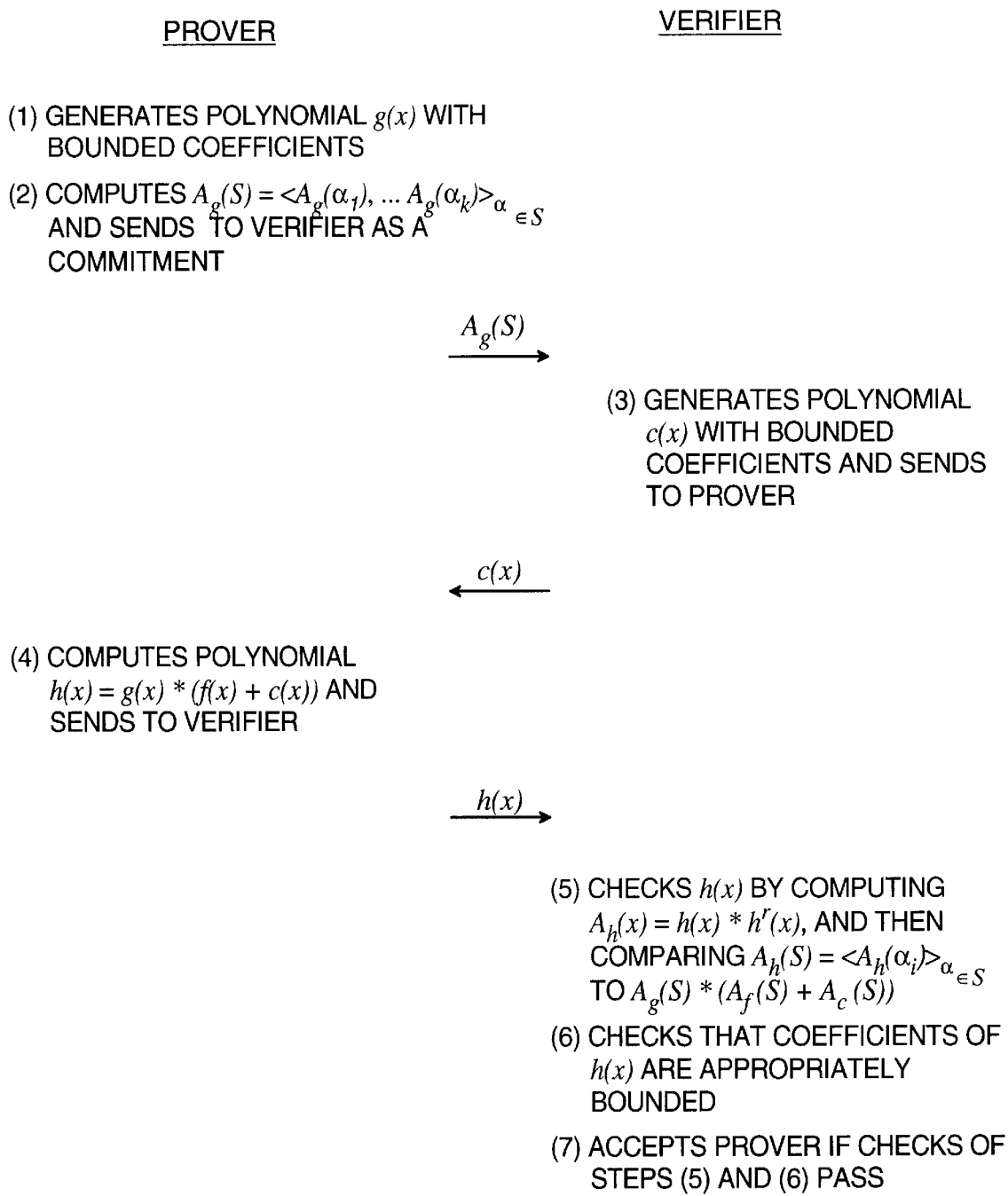

FIG. 5 illustrates a user identification technique in accordance with the second embodiment of the invention. A number of system parameters are established by a central authority and made public to all users. These system parameters include the above-noted prime number q and the public set S of t non-zero integers between 1 and q-1, an integer k and appropriate bounds on polynomial coefficients. A prover randomly chooses a secret polynomial $f(x) \in L_f$ as its private key. The public key of the prover is then generated as $A_f(S)=<A_f(\alpha)>_{\alpha \in S}$, which represents the ordered evaluation of the polynomial $A_f(x)=f(x)*f'(x)$ at the integers in S. It should be noted that as an implementation option, it is possible to perform such an ordered evaluation at a subset of k of the points in S. The identification process is initiated in step (1) of FIG. 5 by the prover generating a polynomial g(x) with bounded coefficients. The polynomial g(x) may be selected at random from a set $L_g$ which is restricted in a manner to be described below. The prover in step (2) uses the polynomial g(x) to compute a commitment. In this second embodiment, the commitment uses the integers of the public set S and is computed as $A_g(S)=<A_g(\alpha_1), \ldots A_g(\alpha_k)>_{\alpha \in S}$. The commitment is then sent to the verifier.

The verifier in step (3) generates a challenge polynomial c(x) with bounded coefficients and sends it to the prover. The polynomial c(x) may be generated by random selection from a set of polynomials $L_c$ which is restricted in a manner to be described below. The prover in step (4) uses the polynomials c(x), g(x) and the secret polynomial f(x) to generate a response polynomial h(x) given by:

$$h(x)=g(x)*(f(x)+c(x))$$

The prover sends h(x) to the verifier. The verifier in step (5) uses its knowledge of the commitment $A_g(S)$, the challenge c(x) and the public key $A_f(S)$ to check that the response polynomial h(x) was generated using the private key f(x) of the prover. The check in this embodiment involves comparing:

$$A_h(\alpha_1) \bmod q \text{ to } A_g(\alpha_1)(A_f(\alpha_1) + A_c(\alpha_1)) \bmod q;$$

$$A_h(\alpha_2) \bmod q \text{ to } A_g(\alpha_2)(A_f(\alpha_2) + A_c(\alpha_2)) \bmod q;$$

$$\ldots \qquad \ldots$$

$$\ldots \qquad \ldots$$

$$A_h(\alpha_k) \bmod q \text{ to } A_g(\alpha_k)(A_f(\alpha_k) + A_c(\alpha_k)) \bmod q.$$

which may be expressed as determining whether $A_h(S)=A_g(S)*(A_f(S)+A_c(S))$. As in the identification technique of the first embodiment, the verifier in step (6) also checks whether or not the coefficients of h(x) are appropriately bounded. The verifier in step (7) accepts the prover as legitimate if the response polynomial h(x) transmitted by the prover passes the checks of steps (5) and (6). The verifier may also perform a number of other checks as part of the identification process.

As in the identification technique of the first embodiment, in order for the verifier to check efficiently whether the response polynomial h(x) is of the right form, the verifier may use a related set of polynomials $L_h'$ which provides an approximation to the set $L_h$ of all legitimate polynomials h(x). The user identification technique of FIG. 5 may be implemented using the exemplary system parameters described above for the identification technique of FIG. 3, including the sets $L_f$, $L_g$, $L_c$ and $L_h'$. The set S may be selected to include t=80 non-zero integers modulo q chosen from the field $\mathbb{F}_{163}$. In addition, the set S may be constructed such that if $\alpha$ is an element of S, then $\alpha^{-1}$ mod q is not an element of S. It should be noted that a given implementation may utilize only a subset of the t elements of S. The alternative implementations noted above for the user identification technique of FIG. 3 are also applicable to the identification technique of FIG. 5.

FIG. 6 illustrates a digital signature technique in accordance with the second embodiment of the invention. The prover in step (1) generates a polynomial g(x) having bounded coefficients, and uses g(x) to generate a commitment $A_g(S)$, as previously described. The prover in step (2) computes a challenge polynomial c(x) by applying a hash function Hash(•, •) to a message m and the commitment $A_g(S)$ so that c(x) is generated as Hash($A_g(S)$, m). The commitment $A_g(S)$ is suitably formatted as an input to the function Hash(•, •) and the output c(x) of Hash(•, •) maps uniformly onto the set $L_c$. In step (3), the prover computes a response polynomial h(x) as, for example, g(x)(f(x)+c(x)). The prover then sends the message m to the verifier, along with the pair ($A_g(S)$, h(x)) as a digital signature on the message m. In step (4), the verifier uses the one-way hash function to compute c(x)=Hash($A_g(S)$, m). The verifier accepts the signature as valid in step (5) if $A_h(S)=A_g(S)(A_f(S)+A_c(S))$ and h(x) is within the set $L_h$. As in the other embodiments, the verifier may determine if h(x) is in a related set of polynomials $L'_h$ rather than in $L_h$ in order to simplify the signature validation process. The alternatives described above for the digital signature technique of the first embodiment, including alternatives in which the digital signature is of the form (h(x), c(x)) or (h(x), g'(x)=$A_g(x)$+m), are also applicable to the digital signature technique of the second embodiment.

The security of the above-described user identification and digital signature techniques depends in part on the selection of appropriate restrictions for the sets $L_f$, $L_g$ and $L_c$ of polynomials from finite field $\mathbb{F}_q$. The following description will use $|L_i|$ to denote the number of polynomials in a given set $L_i$. There are a great many different styles of attack and, depending on the particular embodiment and the particular environment of use, the various styles of attack will have different levels of applicability.

An important class of attacks are those which attempt either to find some polynomial f(x) which can replicate the action of $A_f(x)$ or $A_f(S)$, or to find some way of computing a false h(x) without knowledge of the secret key f(x) which will nevertheless satisfy some verifier. Furthermore, attacks might be mounted by direct consideration of the information revealed by such quantities as the public keys $A_f(x)$ or $A_f(S)$ or by repeatedly observing the communications that pass between prover and verifier. Despite these seemingly diverse opportunities for attack, there appears to be no feasible attack that can be mounted on either the identification techniques of the invention or the corresponding digital signature techniques, provided the system parameters are selected properly. Likely attacks against the identification and signature techniques of the invention may be broadly characterized as being either exhaustive search attacks, statistical attacks or more sophisticated attacks such as lattice reduction techniques.

The complexity of a basic exhaustive search for a polynomial within a particular set, such as a search for f(x) in the set L. is on the order of the size of the set $|L_f|$. More sophisticated exhaustive search attacks might decompose a set into two distinct sets and perform a search by means of matching the entries in two separate lists. There are a great range of attacks of this nature, often termed "meet-in-the-middle attacks" and "birthday-style attacks." If such an attack can be mounted, then the complexity of the attack can be much reduced and this has obvious implications on the parameters that might be chosen. For a security level T against this type of attack, as well as other exhaustive search attacks, system parameters such as q and t, where applicable, and the sizes of sets such as $|L_f|$ should be selected so that $q' \geq T^2$ and $|L_f| \geq T^2$.

The present invention can also be made secure against "cheating verifier" and "fraudulent prover" attacks. A cheating verifier might repeatedly send the same challenge c(x), or some other carefully chosen set of challenges, to a prover in an attempt to derive information which may simplify the determination off(x) or g(x). These are examples of statistical types of attacks. For the digital signature techniques of the invention, the specific choice of c(x) depends on the hash function. But the user identification techniques of the invention appear to be secure against such an attack in part because the unknown polynomial g(x) may be applied to both f(x) and c(x) in the generation of h(x), such that no portion of h(x) remains constant with c(x). It will therefore generally not be possible to simplify the determination off(x) or g(x) by "averaging out" portions of h(x) over multiple challenges with the same c(x). A possible approach to the prevention of cheating verifier attacks is to take the option of specifically choosing the challenge c(x) away from the verifier, while still allowing the verifier to control the value in an unpredictable way. For example, the prover could compute the challenge c(x) as c(x)=Hash ($A_g(x)$,c'(x)) in the first embodiment and c(x)=Hash ($A_g(S)$,c'(x)) in the second embodiment, where c'(x) is chosen by the verifier.

Considering further the possibilities available to a fraudulent prover, such an adversary might also select a polynomial g(x), receive a challenge polynomial c(x) from the verifier, and then attempt to determine a polynomial h(x) which will satisfy the verifier. A basic approach to the determination of h(x) may involve an exhaustive search over all possible polynomials h(x) with the correct coefficient form. Such an attack can be made infeasible by making the number of possible polynomials large enough. This style of attack falls under those described as exhaustive search attacks and includes the above-noted meet-in-the-middle style of attack.

The user identification and digital signature techniques of the invention can also be made secure against more sophisticated types of attacks. For example, the technique appear to resist attacks based on lattice reduction, as described in C. P. Schnorr and H. H. Homer, "Attacking the Chor-Rivest cryptosystem by improved lattice reduction" in L. C. Guillou and J. J. Quisquater, editors, Advances in Cryptology—Eurocrypt '95, Lecture Notes in Computer Science 921, Springer-Verlag, 1995, pp. 1–12. These attacks have been used with a great deal of success on a wide variety of cryptosystems, yet are believed to be ineffectual in attacking the techniques of the invention. Lattice reduction techniques typically rely on an inherent, and often hidden, linearity within a cryptographic system to extract information about a private key or some other secret information. The techniques of the invention appear to be resistant to these attacks since the basic "information primitive" that is revealed to an eavesdropper is a polynomial of the form $A_f(x)$ or its evaluation at a set of points $A_f(S)$. The attacker is forced to choose from an enormous number of potential alternatives in attacking the system. The number of alternatives places practical limits on the attack, and these limits are exceeded by the exemplary system parameters given above.

Another consideration in the security of an identification scheme is the question of whether a prover can answer two different challenges correctly after having committed to a single commitment, which is a property known as "soundness." The soundness property essentially states that if an adversary has some advantage in being able to fool the verifier, where s this advantage is an improved probability of fraud over and above that expected by a participant with no knowledge of the secret f(x), then this advantage can in fact be used to recover either the secret f(x) or equivalent information. It is believed that the property of soundness can be provided for the user identification and digital signature techniques of the invention through appropriate selection of system parameters. It should be noted that soundness is not required for security, and more practical choices for parameters are often available when this property is not considered a requirement.

It should be noted that the techniques described here provide significantly improved computational efficiency relative to prior art techniques. For example, the computation of $A_f(x)$, and its subsequent evaluation, if necessary, are highly efficient operations. Furthermore, the amount of information which must be stored by the prover and verifier and communicated between the prover is not significantly increased by the use of the techniques. It should be emphasized that the techniques described above are exemplary and should not be construed as limiting the present invention to a particular group of illustrative embodiments. Numerous alternative embodiments within the scope of the appended claims will be readily apparent to those skilled in the art.

What is claimed is:

1. An authentication method, carried out between a prover and a verifier, the method comprising the steps of:

generating a response signal as a function of (i) information used to generate a commitment signal representative of a first polynomial, (ii) a challenge signal representative of a second polynomial, and (iii) a private key of the prover, such that the response signal is representative of a third polynomial having two or more terms and satisfying a set of constraints; and sending the response signal from the prover to the verifier, such that the verifier can authenticate a communication from the prover by evaluating a function of information contained in at least a subset of (i) the commitment signal, (ii) the challenge signal, (iii) the response signal and (iv) a public key of the prover.

2. The method of claim 1 wherein the first polynomial satisfies a first set of constraints, the second polynomial satisfies a second set of constraints, and the third polynomial satisfies a third set of constraints.

3. The method of claim 1 wherein the generating step includes computing the third polynomial as the first polynomial times the sum of the private key and the second polynomial.

4. The method of claim 1 further including the step of sending the commitment signal from the prover to the verifier prior to the step of generating the response signal.

5. The method of claim 4 wherein the challenge signal is generated by the verifier and sent as a challenge to the prover in response to receipt of the commitment signal.

6. The method of claim 1 wherein the verifier authenticates the identity of the prover based on the result of evaluating the response signal.

7. The method of claim 1 wherein the challenge signal is a simulated challenge signal generated by the prover applying a hash function to (i) a message and (ii) information used to generate the commitment signal, and the method further includes the step of sending the message from the prover to the verifier.

8. The method of claim 7 wherein the prover sends the simulated challenge signal to the verifier as part of a digital signature on the message.

9. The method of claim 7 wherein the verifier uses a result of applying the hash function to the message and the commitment signal to authenticate a digital signature of the prover.

10. The method of claim 1 wherein:

(i) the first polynomial is a polynomial $A_g(x)$ which is a function of a polynomial g(x), wherein x is an integer value;

(ii) the second polynomial is a polynomial c(x);

(iii) the third polynomial is a polynomial h(x) computed as $g(x)*(f(x)+c(x))$, where * denotes reduced polynomial multiplication and f(x) is a polynomial corresponding to the private key;

(iv) the public key is a polynomial $A_f(x)$ which is a function of f(x); and (v) the verifier authenticates a communication from the prover by comparing $A_h(x)$ to $A_g(x)(A_f(x)+A_c(x))$, where $A_h(x)$ and $A_c(x)$ are functions of h(x) and c(x), respectively.

11. The method of claim 1 wherein:

(i) the commitment signal corresponds to $A_g(S)$, which is a polynomial $A_g(x)$ evaluated at a set S of values $\alpha_i$, where the polynomial $A_g(x)$ is a function of a polynomial g(x), wherein x is an integer value;

(ii) the second polynomial is a polynomial c(x);

(iii) the third polynomial is a polynomial h(x) computed as $g(x)*(f(x)+c(x))$, where * denotes reduced polynomial multiplication and f(x) is a polynomial corresponding to the private key;

(iv) the public key corresponds to $A_f(S)$ and is obtained by evaluating a polynomial $A_f(x)$ at the values ai where $A_f(x)$ is a function of $f(x)$; and (v) the verifier authenticates a communication from the prover by comparing $A_f(S)$ to $A_g(S)*(A_f(S)+A_c(S))$, where $A_c(S)$ is obtained by evaluating a polynomial $A_h(x)$ at the values $\alpha_i$, $A_c(S)$ is obtained by evaluating a polynomial $A_f(x)$ at the values $\alpha_i$, and $A_h(x)$ and $A_c(x)$ are functions of $h(x)$ and $c(x)$, respectively.

12. The method of claim 1 wherein:

(i) the first polynomial is a polynomial $A_g(x)$ which is a function of a polynomial $g(x)$, wherein x is an integer value;

(ii) the second polynomial is a polynomial $c(x)$ generated by applying a hash function to $A_g(x)$ and a message, wherein $A_g(x)$ and the response signal represent a digital signature which is sent with the message from the prover to the verifier;

(iii) the third polynomial is a polynomial $h(x)$ computed as $g(x)*(f(x)+c(x))$, where * denotes reduced polynomial multiplication and $f(x)$ is a polynomial corresponding to the private key;

(iv) the public key is a polynomial $A_f(x)$ which is a function of $f(x)$; and (v) the verifier recovers $c(x)$ by applying the hash function to $A_g(x)$ and the message, and authenticates the digital signature by comparing $A_g(x)$ to $A_g(x)(A_f(x)+A_c(x))$ where $A_h(x)$ and $A_c(x)$ are functions of $h(x)$ and $c(x)$, respectively.

13. The method of claim 1 wherein:

(i) the commitment signal corresponds to $A_g(S)$, which is a polynomial $A_g(x)$ evaluated at a set S of values $\alpha_i$, where the polynomial $A_g(x)$ is a function of a polynomial $g(x)$, wherein x is an integer value;

(ii) the second polynomial is a polynomial $c(x)$ generated by applying a hash function to $A_g(S)$ and a message, wherein $A_g(S)$ and the response signal represent a digital signature which is sent with the message from the prover to the verifier;

(iii) the third polynomial is a polynomial $h(x)$ computed as $g(x)*(f(x)+c(x))$, where * denotes reduced polynomial multiplication and $f(x)$ is a polynomial corresponding to the private key;

(iv) the public key corresponds to $A_f(S)$ and is obtained by evaluating a polynomial $A_f(x)$ at the values $\alpha_i$ where $A_f(x)$ is a function of $f(x)$; and (v) the verifier recovers $c(x)$ by applying the hash function to $A_g(S)$ and the message, and authenticates the digital signature by comparing $A_h(S)$ to $A_g(S)(A_f(S)+A_c(S))$ where $A_h(S)$ is obtained by evaluating $A_h(x)$ at the values $\alpha_i$, $A_c(S)$ is obtained by evaluating $A_c(x)$ at the values $\alpha_i$, and $A_h(x)$ and $A_c(x)$ are functions of $h(x)$ and $c(x)$, respectively.

14. The method of claim 1 wherein:

(i) the first polynomial is a polynomial $A_g(x)$ which is a function of a polynomial $g(x)$, wherein x is an integer value;

(ii) the second polynomial is a polynomial $c(x)$ generated by applying a hash function to $A_g(x)$ and a message, wherein $c(x)$ and the third polynomial represent a digital signature which is sent with the message from the prover to the verifier;

(iii) the third polynomial is a polynomial $h(x)$ computed as $g(x)*(f(x)+c(x))$, where * denotes reduced polynomial multiplication and $f(x)$ is a polynomial corresponding to the private key;

(iv) the public key is a polynomial $A_f(x)$ which is a function of $f(x)$; and (v) the verifier uses $c(x)$ and $h(x)$ to compute $A_c(x)$ and $A_h(x)$, respectively, recovers $A_g(x)$ by computing $A_h(x)(A_f(x)+A_c(x))^{-1}$, and then authenticates the digital signature by comparing $c(x)$ to the result of applying the hash function to $A_g(x)$ and the message, where $A_h(x)$ and $A_c(x)$ are functions of $h(x)$ and $c(x)$, respectively.

15. The method of claim 1 wherein:

(i) the first polynomial is $g(x)$, wherein x is an integer value;

(ii) the second polynomial is a polynomial $c(x)$ generated by applying a hash function to a polynomial $g'(x)$ computed as $A_g(x)+m$ where $A_g(x)$ is a function of $g(x)$ and m is a message, and wherein $g'(x)$ and the third polynomial represent a digital signature which is sent with the message from the prover to the verifier;

(iii) the third polynomial is a polynomial $h(x)$ computed as $g(x)*(f(x)+c(x))$, where * denotes reduced polynomial multiplication and $f(x)$ is a polynomial corresponding to the private key;

(iv) the public key is a polynomial $A_f(x)$ which is a function of $f(x)$; and (v) the verifier computes $c(x)$ by applying the hash function to $g'(x)$, recovers $A_g(x)$ by computing $A_h(x)(A_f(x)+A_c(x))^{-1}$, recovers the message m by computing $g'(x)-A_g(x)$, and then authenticates the digital signature by determining if m has an expected redundancy, where $A_h(x)$ and $A_c(x)$ are functions of $h(x)$ and $c(x)$, respectively.

16. The method of claim 1 wherein:

(i) the commitment signal corresponds to $A_g(S)$, which is a polynomial $A_g(x)$ evaluated at a set S of values $\alpha_i$, where the polynomial $A_g(x)$ is a function of a polynomial $g(x)$, wherein x is an integer value;

(ii) the second polynomial is a polynomial $c(x)$ generated by applying a hash function to $A_g(S)$ and a message, wherein $c(x)$ and the third polynomial represent a digital signature which is sent with the message from the prover to the verifier;

(iii) the third polynomial is a polynomial $h(x)$ computed as $g(x)*(f(x)+c(x))$, where * denotes reduced polynomial multiplication and $f(x)$ is a polynomial corresponding to the private key;

(iv) the public key corresponds to $A_f(S)$ and is obtained by evaluating a polynomial $A_f(x)$ at the values $\alpha_i$ where $A_f(x)$ is a function of $f(x)$; and (v) the verifier uses $c(x)$ and $h(x)$ to compute $A_c(S)$ and $A_h(S)$, respectively, recovers $A_g(S)$ by computing $A_h(S)(A_f(S)+A_c(S))^{-1}$, and then authenticates the digital signature by comparing $c(x)$ to the result of applying the hash function to $A_g(S)$ and the message, where $A_h(S)$ and $A_c(S)$ are functions of $h(x)$ and $c(x)$, respectively, evaluated at the values $\alpha_i$.

17. The method of claim 1 wherein:

(i) the commitment signal corresponds to $A_g(S)$, which is a polynomial $A_g(x)$ evaluated at a set S of values $\alpha^i$, where the polynomial $A_g(x)$ is a function of a polynomial $g(x)$, wherein x is an integer value;

(ii) the second polynomial is a polynomial $c(x)$ generated by applying a hash unction to a polynomial $g'(x)$ computed as $A_g(S)+m$ where in is a message, and wherein $g'(x)$ and the third polynomial represent a digital signature which is sent with the message from the prover to the verifier;

(iii) the third polynomial is a polynomial h(x) computed as g(x)*(f(x)+c(x)), where * denotes reduced polynomial multiplication and f(x) is a polynomial corresponding to the private key;

(iv) the public key corresponds to $A_f(S)$ and is obtained by evaluating a polynomial $A_f(x)$ at the values $\alpha_i$, where $A_f(x)$ is a function of f(x); and (v) the verifier computes c(x) by applying the hash function to g'(x), recovers $A_g(S)$ by computing $A_h(S)$ $(A_f(S)+A_c(S))^{-1}$, recovers the message m by computing g'(x)−$A_g(S)$, and then authenticates the digital signature by determining if m has an expected redundancy, where $A_h(S)$ and $A_c(S)$ are functions of h(x) and c(x), respectively, evaluated at the values $\alpha^i$.

18. An apparatus for implementing an authentication process between a prover and a verifier, the apparatus comprising:

a memory for storing a private key of the prover; and a processor coupled to the memory and operative to generate a response signal as a function of (i) information used to generate a commitment signal representative of a first polynomial, (ii) a challenge signal representative of a second polynomial, and (iii) the private key of the prover, such that the response signal is representative of a third polynomial having two or more terms and satisfying a set of constraints, wherein the processor is further operative to send the response signal from the prover to the verifier, such that the verifier can authenticate a communication from the prover by evaluating a function of information contained in at least a subset of (i) the commitment signal, (ii) the challenge signal, (iii) the response signal and (iv) a public key of the prover.

19. The apparatus of claim 18 wherein the first polynomial satisfies a first set of constraints, the second polynomial satisfies a second set of constraints, and the third polynomial satisfies a third set of constraints.

20. The apparatus of claim 18 wherein the processor is further operative to compute the third polynomial as the first polynomial times the sum of the private key and the second polynomial.

21. The apparatus of claim 18 wherein the processor is further operative to send the commitment signal from the prover to the verifier prior to generating the response signal.

22. The apparatus of claim 21 wherein the challenge signal is generated by the verifier and sent as a challenge to the prover in response to receipt of the commitment signal.

23. The apparatus of claim 18 wherein the verifier authenticates the identity of the prover based on the result of a result of evaluating the response signal.

24. The apparatus of claim 18 wherein the processor is further operative to generate the challenge signal as a simulated challenge signal by applying a hash function to (i) a message and (ii) information used to generate the commitment signal, and to send the message from the prover to the verifier.

25. The apparatus of claim 24 wherein the processor is further operative to send the simulated challenge signal to the verifier as part of a digital signature on the message.

26. The apparatus of claim 24 wherein the verifier uses a result of applying the hash function to the message and the commitment signal to authenticate a digital signature of the prover.

27. The apparatus of claim 18 wherein:

(i) the first polynomial is a polynomial $A_g(x)$ which is a function of a polynomial g(x), wherein x is an integer value;

(ii) the second polynomial is a polynomial c(x);

(iii) the third polynomial is a polynomial h(x) computed as g(x)*(f(x)+c(x)), where * denotes reduced polynomial multiplication and f(x) is a polynomial corresponding to the private key;

(iv) the public key is a polynomial $A_f(x)$ which is a function of f(x); and (v) the verifier authenticates a communication from the prover by comparing $A_h(x)$ to $A_g(x)(A_f(x)+A_c(x))$, where $A_h(x)$ and $A_c(x)$ are functions of h(x) and c(x) respectively.

28. The apparatus of claim 18 wherein:

(i) the commitment signal corresponds to $A_g(S)$, which is a polynomial $A_g(x)$ evaluated at a set S of values $\alpha_i$, where the polynomial $A_g(x)$ is a function of a polynomial g(x), wherein x is an integer value;

(ii) the second polynomial is a polynomial c(x);

(iii) the third polynomial is a polynomial h(x) computed as g(x)*(f(x)+c(x)), where * denotes reduced polynomial multiplication and f(x) is a polynomial corresponding to the private key;

(iv) the public key corresponds to $A_f(S)$ and is obtained by evaluating a polynomial $A_f(x)$ at the values $\alpha_i$ where $A_f(x)$ is a function of f(x); and (v) the verifier authenticates a communication from the prover by comparing $A_h(S)$ to $A_g(S)*(A_f(S)+A_c(S))$, where $A_h(S)$ is obtained by evaluating a polynomial $A_h(x)$ at the values $\alpha_i$, $A_c(S)$ is obtained by evaluating a polynomial $A_c(x)$ at the values $\alpha_i$, and $A_h(x)$ and $A_c(x)$ are functions of h(x) and c(x), respectively.

29. The apparatus of claim 18 wherein:

(i) the first polynomial is a polynomial $A_g(x)$ which is a function of a polynomial g(x), wherein x is an integer value;

(ii) the second polynomial is a polynomial c(x) generated by applying a hash function to $A_g(x)$ and a message, wherein $A_g(x)$ and the response signal represent a digital signature which is sent with the message from the prover to the verifier;

(iii) the third polynomial is a polynomial h(x) computed as g(x)*(f(x)+c(x)), where * denotes reduced polynomial multiplication and f(x) is a polynomial corresponding to the private key;

(iv) the public key is a polynomial $A_f(x)$ which is a function of f(x) ; and (v) the verifier recovers c(x) by applying the hash function to $A_g(x)$ and the message, and authenticates the digital signature by comparing $A_h(x)$ to $A_g(x)(A_f(x)+A_c(x))$ where $A_h(x)$ and $A_c(x)$ are functions of h(x) and c(x), respectively.

30. The apparatus of claim 18 wherein:

(i) the commitment signal corresponds to $A_g(S)$, which is a polynomial $A_g(x)$ evaluated at a set S of values $\alpha_i$, where the polynomial $A_g(x)$ is a function of a polynomial g(x), wherein x is an integer value;

(ii) the second polynomial is a polynomial c(x) generated by applying a hash function to $A_g(S)$ and a message, wherein $A_g(S)$ and the response signal represent a digital signature which is sent with the message from the prover to the verifier;

(iii) the third polynomial is a polynomial h(x) computed as g(x)*(f(x)+c(x)), where * denotes reduced polynomial multiplication and f(x) is a polynomial corresponding to the private key;

(iv) the public key corresponds to $A_f(S)$ and is obtained by evaluating a polynomial $A_f(x)$ at the values $\alpha_i$ where $A_f(x)$ is a function of $f(x)$; and (v) the verifier recovers $c(x)$ by applying the hash function to $A_g(S)$ and the message, and authenticates the digital signature by comparing $A_h(S)$ to $A_g(S)(A_f(S)+A_c(S))$ where $A_h(S)$ is obtained by evaluating $A_h(x)$ at the values $\alpha_i$, $A_c(S)$ is obtained by evaluating $A_c(x)$ at the values $\alpha_i$, and $A_h(x)$ and $A_c(x)$ are functions of $h(x)$ and $c(x)$, respectively.

31. The apparatus of claim 18 wherein:

(i) the first polynomial is a polynomial $A_g(x)$ which is a function of a polynomial $g(x)$, wherein x is an integer value;

(ii) the second polynomial is a polynomial $c(x)$ generated by applying a hash function to $A_g(x)$ and a message, wherein $c(x)$ and the third polynomial represent a digital signature which is sent with the message from the prover to the verifier;

(iii) the third polynomial is a polynomial $h(x)$ computed as $g(x)*(f(x)+c(x))$, where * denotes reduced polynomial multiplication and $f(x)$ is a polynomial corresponding to the private key;

(iv) the public key is a polynomial $A_f(x)$ which is a function of $f(x)$; and (v) the verifier uses $c(x)$ and $h(x)$ to compute $A_c(x)$ and $A_h(x)$, respectively, recovers $A_g(x)$ by computing $A_h(x)(A_f(x)+A_c(x))^{-1}$, and then authenticates the digital signature by comparing $c(x)$ to the result of applying the hash function to $A_g(x)$ and the message, where $A_h(x)$ and $A_c(x)$ are functions of $h(x)$ and $c(x)$, respectively.

32. The apparatus of claim 18 wherein:

(i) the first polynomial is $g(x)$, wherein x is an integer value;

(ii) the second polynomial is a polynomial $c(x)$ generated by applying a hash function to a polynomial $g'(x)$ computed as $A_g(x)+m$ where $A_g(x)$ is a function of $g(x)$ and m is a message, and wherein $g'(x)$ and the third polynomial represent a digital signature which is sent with the message from the prover to the verifier;

(iii) the third polynomial is a polynomial $h(x)$ computed as $g(x)*(f(x)+c(x))$, where * denotes reduced polynomial multiplication and $f(x)$ is a polynomial corresponding to the private key;

(iv) the public key is a polynomial $A_f(x)$ which is a function of $f(x)$; and (v) the verifier computes $c(x)$ by applying the hash function to $g'(x)$, recovers $A_g(x)$ by computing $A_h(x)(A_f(x)+A_c(x))^{-1}$, recovers the message m by computing $g'(x)-A_g(x)$, and then authenticates the digital signature by determining if m has an expected redundancy, where $A_h(x)$ and $A_c(x)$ are functions of $h(x)$ and $c(x)$, respectively.

33. The apparatus of claim 18 wherein:

(i) the commitment signal corresponds to $A_g(S)$, which is a polynomial $A_g(x)$ evaluated at a set S of values $\alpha_i$, where the polynomial $A_g(x)$ is a function of a polynomial $g(x)$, wherein x is an integer value;

(ii) the second polynomial is a polynomial $c(x)$ generated by applying a hash function to $A_g(S)$ and a message, wherein $c(x)$ and the third polynomial represent a digital signature which is sent with the message from the prover to the verifier;

(iii) the third polynomial is a polynomial $h(x)$ computed as $g(x)*(f(x)+c(x))$, where * denotes reduced polynomial multiplication and $f(x)$ is a polynomial corresponding to the private key;

(iv) the public key corresponds to $A_f(S)$ and is obtained by evaluating a polynomial $A_f(x)$ at the values $\alpha_i$ where $A_f(x)$ is a function of $f(x)$; and (v) the verifier uses $c(x)$ and $h(x)$ to compute $A_c(S)$ and $A_h(S)$, respectively, recovers $A_g(S)$ by computing $A_h(S)(A_f(S)+A_c(S))^{-1}$, and then authenticates the digital signature by comparing $c(x)$ to the result of applying the hash function to $A_g(S)$ and the message, where $A_h(S)$ and $A_c(S)$ are functions of $h(x)$ and $c(x)$, respectively, evaluated at the values $\alpha_i$.

34. The apparatus of claim 18 wherein:

(i) the commitment signal corresponds to $A_g(S)$, which is a polynomial $A_g(x)$ evaluated at a set S of values $\alpha_i$, where the polynomial $A_g(x)$ is a function of a polynomial $g(x)$, wherein x is an integer value;

(ii) the second polynomial is a polynomial $c(x)$ generated by applying a hash function to a polynomial $g'(x)$ computed as $A_g(S)+m$ where m is a message, and wherein $g'(x)$ and the third polynomial represent a digital signature which is sent with the message from the prover to the verifier;

(iii) the third polynomial is a polynomial $h(x)$ computed as $g(x)*(f(x)+c(x))$, where * denotes reduced polynomial multiplication and $f(x)$ is a polynomial corresponding to the private key;

(iv) the public key corresponds to $A_f(S)$ and is obtained by evaluating a polynomial $A_f(x)$ at the values $\alpha_i$ where $A_f(x)$ is a function of $f(x)$; and (v) the verifier computes $c(x)$ by applying the hash function to $g'(x)$, recovers $A_g(S)$ by computing $A_h(S)(A_f(S)+A_c(S))^{-1}$, recovers the message m by computing $g'(x)-A_g(S)$, and then authenticates the digital signature by determining if m has an expected redundancy, where $A_h(S)$ and $A_c(S)$ are functions of $h(x)$ and $c(x)$, respectively, evaluated at the values $\alpha_i$.

35. An authentication method, carried out between a prover and a verifier, the method comprising the steps of:

receiving in the verifier a response signal from the prover generated as a function of (i) information used to generate a commitment signal representative of a first polynomial, (ii) a challenge signal representative of a second polynomial, and (iii) a private key of the prover, such that the response signal is representative of a third polynomial having two or more terms and satisfying a set of constraints; and authenticating in the verifier a communication from the prover by evaluating a function of information contained in at least a subset of (i) the commitment signal, (ii) the challenge signal, (iii) the response signal and (iv) a public key of the prover.

36. An apparatus for implementing an authentication process between a prover and a verifier, the apparatus comprising:

a memory associated with the verifier for storing a public key of the prover; and a processor coupled to the memory and operative to receive a response signal from the prover generated as a function of (i) information used to generate a commitment signal representative of a first polynomial, (ii) a challenge signal representative of a second polynomial, and (iii) a private key of the prover, such that the response signal is representative of a third polynomial having two or more terms and satisfying a set of constraints; and to authenticate a communication from the prover by evaluating a function of information contained in at least a subset of (i) the commitment signal, (ii) the challenge signal, (iii) the response signal and (iv) a public key of the prover.

* * * * *

UNITED STATES PATENT AND TRADEMARK OFFICE
CERTIFICATE OF CORRECTION

PATENT NO. : 6,076,163
DATED : June 13, 2000
INVENTOR(S) : Hoffstein et al

Page 1 of 2

It is certified that error appears in the above-indentified patent and that said Letters Patent is hereby corrected as shown below:

In column 15, line 2, delete "ai" and substitute --$\alpha_i$-- therefor.

In column 15, line 5, after "comparing" delete "$A_f(S)$" and substitute --$A_h(S)$-- therefor.

In column 15, line 6, delete "$A_c(S)$" and substitute --$A_h(S)$-- therefor.

In column 15, line 8, delete "$A_f(x)$" and substitute --$A_c(S)$-- therefor.

In column 15, line 27, after "comparing" delete "$A_g(x)$" and substitute --$A_h(x)$-- therefor.

In column 16, line 17, delete "with the message".

UNITED STATES PATENT AND TRADEMARK OFFICE
CERTIFICATE OF CORRECTION

PATENT NO. : 6,076,163
DATED : June 13, 2000
INVENTOR(S) : Hoffstein *et al.*

It is certified that error appears in the above-indentified patent and that said Letters Patent is hereby corrected as shown below:

In column 16, line 57, delete "$\alpha^i$" and substitute --$\alpha_i$-- therefor.

In column 16, line 61, insert --f-- immediately before "unction".

In column 16, line 64, delete "with the message".

In column 17, line 14, delete "$\alpha^i$" and substitute --$\alpha_i$"-- therefor.

In column 19, line 40, delete "with the message".

In column 20, line 31, delete "with the message".

Signed and Sealed this

Third Day of April, 2001

*Attest:*

NICHOLAS P. GODICI

*Attesting Officer*   Acting Director of the United States Patent and Trademark Office